(12) United States Patent
Reinhart et al.

(10) Patent No.: US 8,733,088 B2
(45) Date of Patent: May 27, 2014

(54) EXHAUST MANIFOLD SYSTEM AND COLLAR COOLANT JACKET

(75) Inventors: Paul T. Reinhart, Livonia, MI (US); Ramon Michael Lee, Commerce Township, MI (US); Raymond Gregory Puhl, Dearborn, MI (US); Eric Garner Ladner, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 523 days.

(21) Appl. No.: 12/726,285

(22) Filed: Mar. 17, 2010

(65) Prior Publication Data

US 2011/0131963 A1 Jun. 9, 2011

(51) Int. Cl.
*F01N 3/02* (2006.01)

(52) U.S. Cl.
USPC .................. 60/320; 60/321; 60/323; 60/324; 60/280

(58) Field of Classification Search
USPC ................. 60/320, 321, 322, 123, 323, 324
See application file for complete search history.

(56) References Cited

U.S. PATENT DOCUMENTS

| | | | | |
|---|---|---|---|---|
| 1,617,986 A | | 3/1921 | Blank | |
| 3,169,365 A | * | 2/1965 | Benjamen | 60/321 |
| 3,206,836 A | * | 9/1965 | Schlussler | 29/890.08 |
| 3,470,690 A | * | 10/1969 | Thompson | 60/303 |
| 3,505,028 A | | 4/1970 | Douthit | |
| 3,884,194 A | * | 5/1975 | Grosseau | 122/7 R |
| 4,214,443 A | * | 7/1980 | Herenius | 60/321 |
| 4,512,148 A | * | 4/1985 | Jacobson | 60/321 |
| 4,866,934 A | * | 9/1989 | Lindstedt | 60/321 |
| 5,148,675 A | * | 9/1992 | Inman | 60/321 |
| 5,867,985 A | * | 2/1999 | Furuhashi et al. | 60/323 |
| 6,397,589 B1 | * | 6/2002 | Beson et al. | 60/320 |
| 6,652,337 B1 | * | 11/2003 | Logan et al. | 440/88 J |
| 7,013,565 B1 | * | 3/2006 | Zelinski | 29/890.08 |
| 7,287,493 B2 | * | 10/2007 | Buck | 123/41.01 |
| 7,552,586 B1 | * | 6/2009 | White | 60/302 |
| 7,803,026 B2 | * | 9/2010 | McKinney | 440/89 R |
| 7,827,690 B1 | * | 11/2010 | Zelinski | 29/890.08 |
| 2002/0049015 A1 | * | 4/2002 | Suzuki et al. | 440/89 |
| 2007/0062182 A1 | * | 3/2007 | Westerbeke, Jr. | 60/321 |
| 2008/0012296 A1 | * | 1/2008 | Johnston et al. | 285/224 |
| 2008/0174111 A1 | * | 7/2008 | McGee et al. | 285/148.2 |

FOREIGN PATENT DOCUMENTS

| | | |
|---|---|---|
| JP | 04187810 A | 7/1992 |
| JP | 04353212 | 8/1992 |
| JP | 2012202284 A * | 10/2012 |

* cited by examiner

*Primary Examiner* — Thomas Denion
*Assistant Examiner* — Patrick Maines
(74) *Attorney, Agent, or Firm* — Greg Brown; Alleman Hall McCoy Russell & Tuttle LLP

(57) ABSTRACT

An exhaust manifold of a turbocharged engine includes a collar coolant jacket to maintain component temperatures within acceptable limits. The collar coolant jacket is specifically located around the exhaust outlet of the manifold.

16 Claims, 7 Drawing Sheets

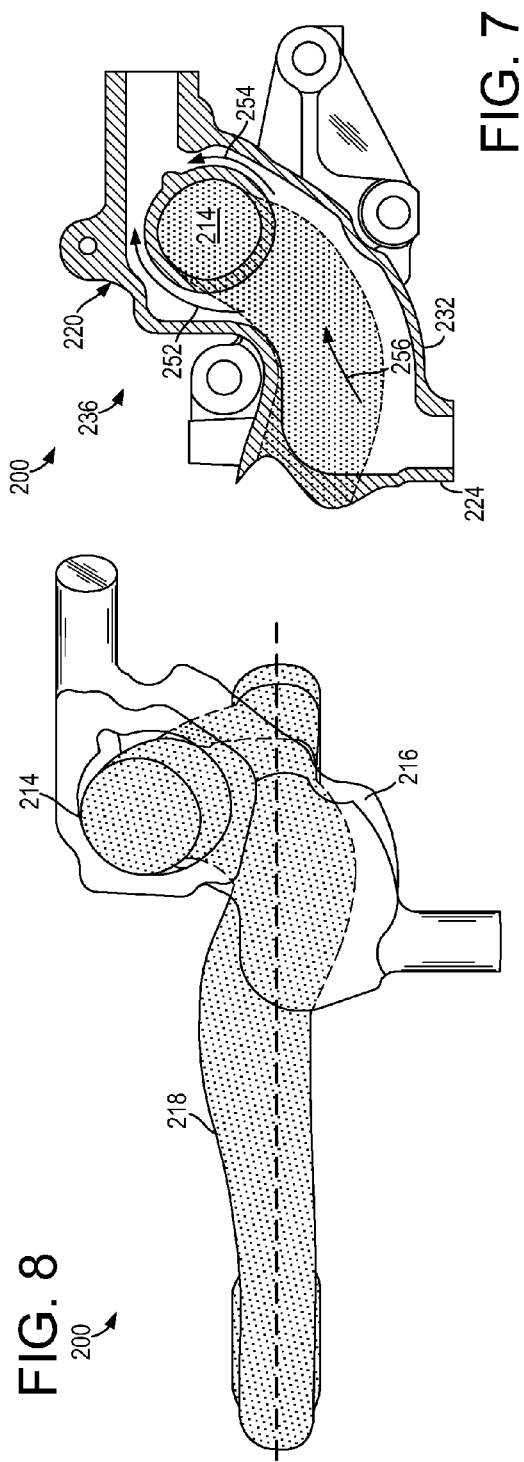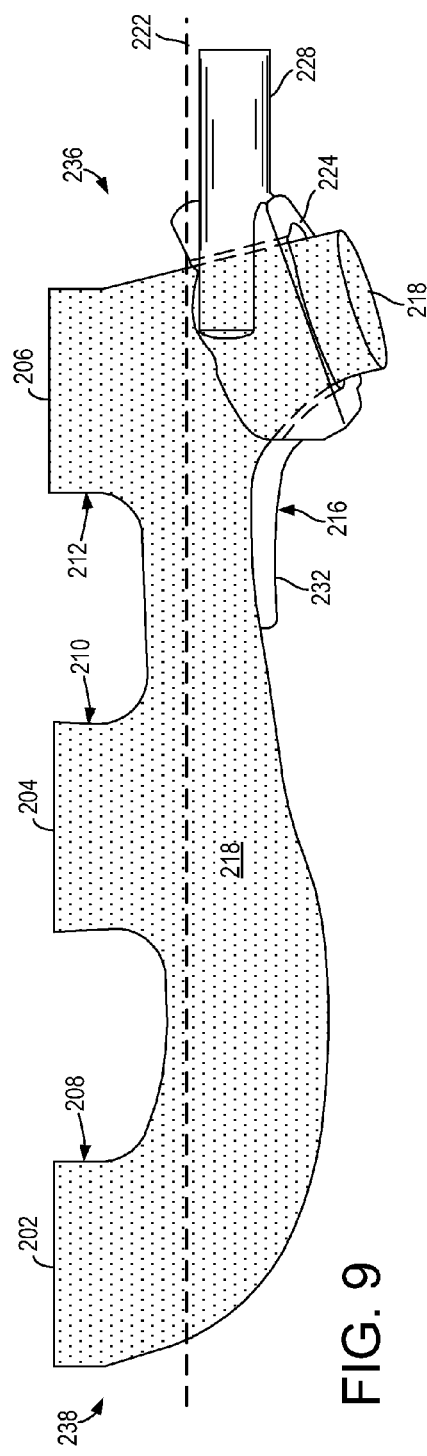

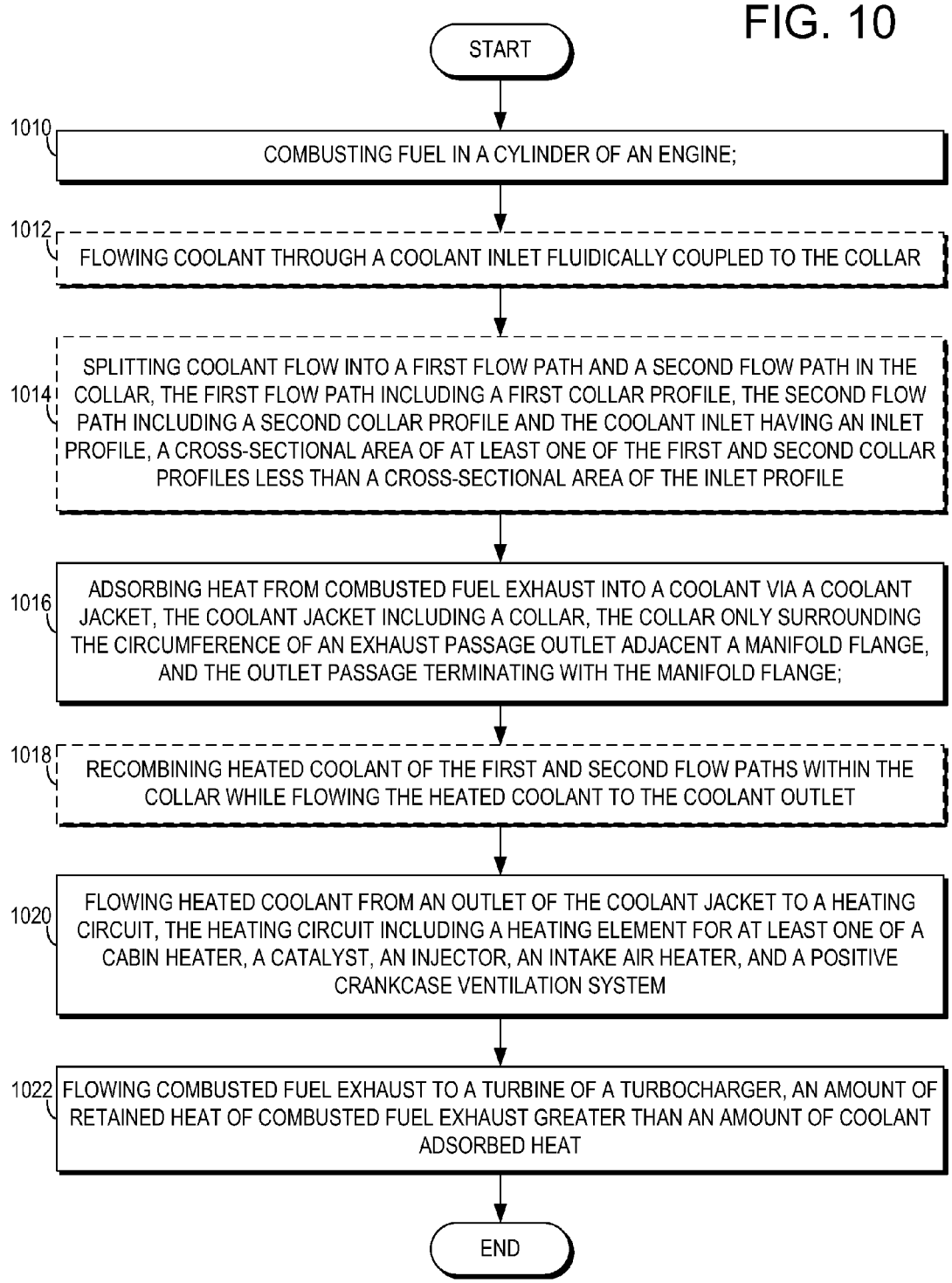

EXHAUST MANIFOLD SYSTEM AND COLLAR COOLANT JACKET

TECHNICAL FIELD

The present application relates to exhaust manifold systems and methods of heating engine systems and more particularly to cast exhaust manifolds including a collar coolant jacket.

BACKGROUND AND SUMMARY

An exhaust manifold of a turbocharged engine is exposed to thermal loads not present in a typical cast iron or stainless steel exhaust manifold of a naturally aspirated engine. One approach to compensate for increased temperature loads and reduce manifold degradation includes a ferritic or austenitic stainless steel cast exhaust manifold. Such steel materials may reduce the thermal expansion of the manifold, increase the thermal insulation of the manifold and protect the manifold from creep degradation, for example. A further approach involves cooling via a coolant jacket encompassing a major portion of the exhaust manifold.

The inventors herein have recognized issues with the above described approaches. The inclusion of ferritic or austenitic stainless steel materials in an exhaust manifold may significantly increase manifold cost in comparison to manifolds without such materials. Further, cooling the exhaust manifold via encompassing a majority or more of an exhaust manifold removes thermal energy that would otherwise improve both turbocharger and catalyst function and performance.

Accordingly, as a brief summary, devices, systems and methods are disclosed for a coolant jacket included in an exhaust manifold. In one example an exhaust manifold system includes a plurality of inlets to runners extending perpendicular a longitudinal manifold axis, an outlet passage distal from the runners, the outlet passage terminating with a manifold flange, and a coolant jacket including a coolant inlet and outlet both for coupling to a coolant system, and a collar fluidically coupling the coolant inlet and outlet, the collar adjacent the outlet passage and the manifold flange and decoupled from the runners.

In a further example a method of heating engine systems, the method includes combusting fuel in a cylinder of an engine, adsorbing heat from combusted fuel exhaust into a coolant via a coolant jacket, the coolant jacket including a collar, the collar only surrounding the circumference of an exhaust passage outlet adjacent an exhaust manifold flange, the outlet asymmetrically positioned at a first manifold end, distal from a plurality of exhaust runners, the outlet passage extending out away from a plane including the totality of runners and the outlet passage extending parallel from the runners away from inlets included in the runners, and the outlet passage terminating with a manifold flange, flowing heated coolant from an outlet of the coolant jacket to a heating circuit, the heating circuit including a heating element for at least one of a cabin heater, a catalyst, an injector, an intake air heater, and a positive crankcase ventilation system, and flowing combusted fuel exhaust to a turbine of a turbocharger, an amount of retained heat of combusted fuel exhaust greater than an amount of coolant adsorbed heat.

By including the collar water jacket surrounding the outlet passage, the exhaust manifold system may include lower-cost materials (e.g., a silicon molybdenum) while removing less thermal energy—thermal energy that can be used to increase turbocharger and catalyst performance. Another advantage is that the collar coolant jacket is a heat source (for example during engine warm up) for a heating element, such as in a cabin heater, a catalyst, an injector, an intake air heater, and/or a positive crankcase ventilation system.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

FIG. 7 shows a third cut-away view of a first end of the example exhaust manifold of FIG. 2.

FIG. 8 shows a first view of the coolant and exhaust passages of the example manifold of FIG. 2.

FIG. 9 shows a second view of the coolant and exhaust passages of the example manifold of FIG. 2.

FIG. 10 illustrates an example method for heating engine systems.

DETAILED DESCRIPTION

First an engine and related exhaust systems are discussed with reference to FIG. 1. Next an example exhaust manifold shown in FIGS. 2-9 is discussed. Then, an example method for heating engine systems with the exhaust manifold system described in FIGS. 1-9 is discussed with respect to FIG. 10.

Figure 1:
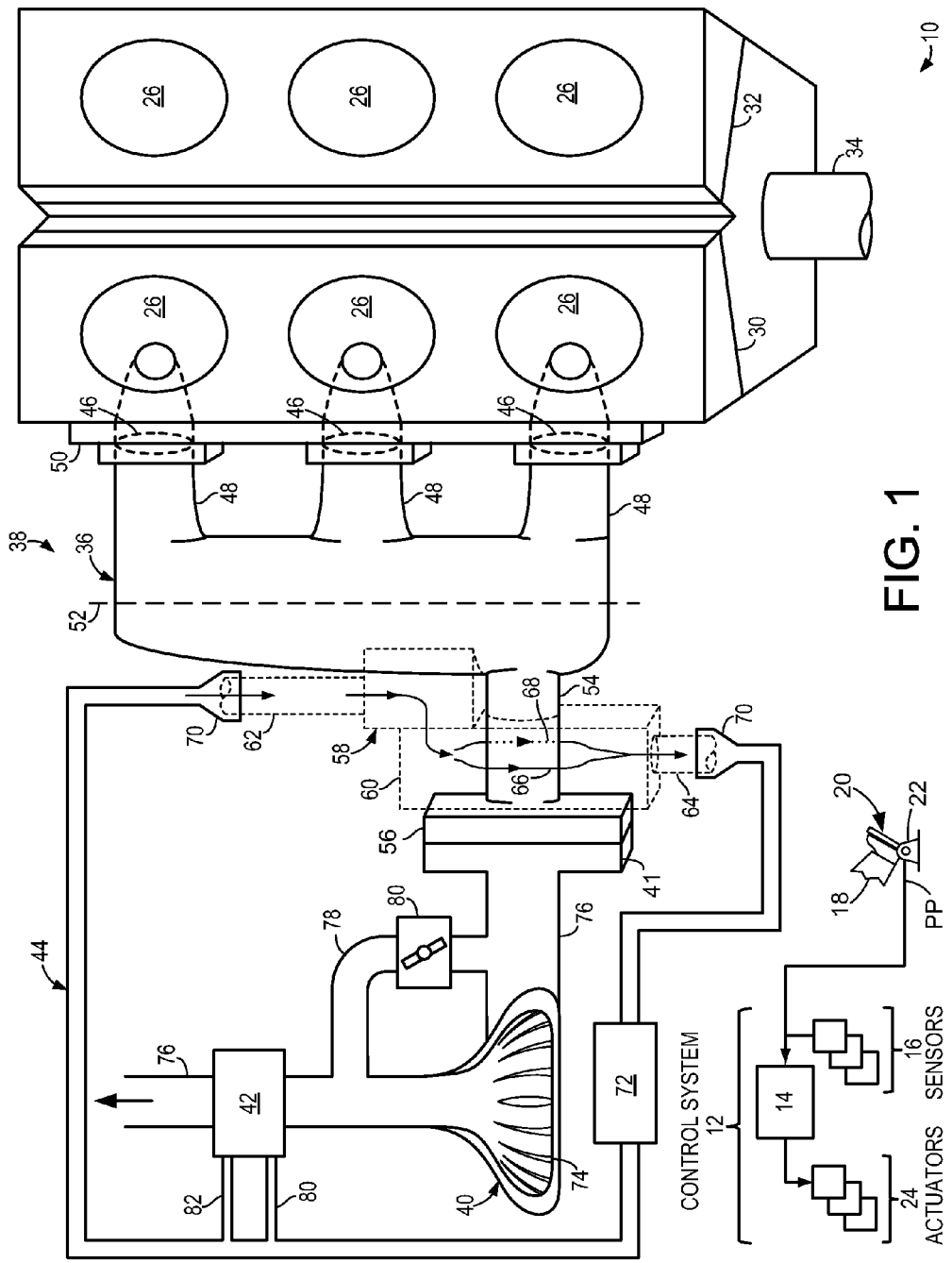
FIG. 1 shows an engine including an exhaust manifold system.

Turning first to FIG. 1, aspects of an example engine 10 are shown. Multi-cylinder engine 10 may be included in a propulsion system of an automobile. In the present example, engine 10 is shown in a V6 configuration, however further examples may include V8, V12, I4, I6, boxer, and additional engine configurations. Engine 10 may be a spark ignition engine or compression ignition engine.

Engine 10 may be controlled at least partially by a control system 12 including controller 14 and by input from sensors 16 and/or a vehicle operator 18 via an input device 20. In this example, input device 20 includes an accelerator pedal and a pedal position sensor 22 for generating a proportional pedal position signal PP. Controller 14 outputs signals and commands to actuators 24 to control the operation of engine 10 and related systems.

A plurality of combustion chambers (cylinders) 26 is included in engine 10, each including combustion chamber walls with a piston positioned therein. Engine 10 includes an engine block 28 coupled to cylinder heads 30, the combustion chamber walls defined by the engine block 28, first cylinder head 30, and second cylinder head 32. Each piston may be coupled to crankshaft 34 so that reciprocating motion of each piston is translated into rotational motion of the crankshaft. Crankshaft 34 may be coupled to at least one drive wheel of a vehicle via an intermediate transmission system. Further, a starter motor may be coupled to crankshaft 34 via a flywheel to enable a starting operation of engine 10.

Each combustion chamber 26 may receive intake air from an intake manifold via an intake passage (not shown) and may exhaust combustion gases via an exhaust manifold 36. The intake manifold and exhaust manifold 36 can selectively communicate with combustion chambers 26 via respective intake valves and exhaust valves (not shown). In some embodiments, one or more of the combustion chambers 26 may include two or more intake valves and/or two or more exhaust valves. Engine intake valves and engine exhaust valves may be mechanically actuated (e.g., by an over head cam), electro-magnetically actuated (e.g., EVA) or some combination of the two. Further, engine 10 may include port injection or direct injection in one or more of the plurality of combustion chambers 26.

In the present example, exhaust manifold 36 is only coupled to a first cylinder bank of first cylinder head 30. A second exhaust manifold (e.g., coupled to a second cylinder bank included in second cylinder head 32) is not shown for the sake of simplicity. However, a second exhaust manifold in a "V" configuration engine may be provided. Further, in the present example, exhaust manifold 36 is included as part of exhaust manifold system 38 that also includes turbocharger 40, exhaust aftertreatment system 42, and coolant system circuit 44.

Furthermore, exhaust manifold 36 includes a cast housing. The housing may include an alloy of iron (e.g., nodular, ductile, etc), carbon, and a number of additives such as Si, Cr, Mo, Ni and Sn. Exhaust manifold 36 includes a plurality of inlets 46 at the end of a plurality of runners 48, the inlets coupled to the cylinder head 30 via the cylinder head gasket 50. The plurality of inlets 46 to runners 48 extend perpendicular a longitudinal manifold axis 52, the longitudinal axis extending in a longitudinal direction along the cylinder head from each combustion chamber 26 in the first cylinder head 30.

Manifold 36 further includes an outlet passage 54 distal from the runners 48. In the present example, outlet passage 54 is shown reflected across longitudinal axis 52 from the runners 48. Additionally, the outlet passage 54 terminates with a manifold flange 56. In the present example, a turbocharger casing flange 41 of turbocharger 40 is coupled to the manifold flange 56 to receive exhaust gas from the exhaust manifold 36.

Manifold 36 further includes a coolant jacket 58. Included in coolant jacket 58 are a collar 60, a coolant inlet 62 and a coolant outlet 64. The collar 60 fluidically couples the coolant inlet 62 and outlet 64 and the collar 60 includes a first flow path 66 and a second flow path 68, discussed in more detail below with respect to FIG. 8. Further, the collar 60 is adjacent the outlet passage 54 and the manifold flange 56. The collar 60 may be positioned to lessen overall thermal energy transfer between the manifold 36 and the coolant jacket 58. Further, the collar 60 may increase thermal energy transfer at locations that are vulnerable to high thermal loads (e.g., the manifold flange 56 and outlet passage 54). Specifically, the collar 60 is decoupled from (e.g., not directly coupled to, and not adjacent to) the runners 48 and may further be decoupled from the majority of manifold 36 housing surface area.

In the present example, exhaust manifold system 38 further includes a coolant system circuit 44. Both the coolant inlet 62 and coolant outlet 64 of coolant jacket 58 are coupled to the coolant system circuit 44. In the present example, quick connect tubes 70 couple the inlet 62 and outlet 64 to the coolant system circuit 44. Each quick connect tube 70 includes an annular elastomeric seal and a snap ring at an end of the tube. The snap ring secures each tube 70 in place via a straight line axial movement of the tube over the outlet 64 or inlet 62 so that the secured tube 70 forms a dynamic seal.

The coolant system circuit 44 includes a heating element 72. Heating element 72 may be included in at least one of a cabin heater, a catalyst, an injector, an intake air heater, and a positive crankcase ventilation system. In further examples, coolant jacket 58 includes a plurality of inlets receiving coolant and/or outlets returning coolant from two or more coolant circuits of a coolant system, including a plurality of heating elements. Coolant system circuit 44 may be coupled to further coolant and heating system components, such as a radiator, heater core, and the like.

In the present example, turbocharger 40 is coupled to the exhaust manifold 36 at manifold flange 56. In additional examples, two exhaust manifolds are each coupled to two turbochargers, one turbocharger coupled to each exhaust manifold (e.g., a twin turbocharger configuration). Further still, turbocharger 40 may be coupled to two exhaust manifolds. Turbocharger 40 includes a compressor (not shown) arranged along the intake passage and which may be at least partially driven by a turbine 74 (e.g., via a shaft) arranged in exhaust passage 76. The compressor may also be at least partially driven by the engine (e.g., via crankshaft 34) and/or an electric machine. Turbocharger 40 includes a bypass passage 78 coupled intermediate the manifold 36 and the turbine 74 as well as intermediate the turbine 74 and exhaust aftertreatment system 42, a waste gate 80 disposed within the bypass passage 78. The amount of compression provided to one or more cylinders 26 of the engine via turbocharger 40 may be varied by controller 14 through, for example, control of waste gate 80.

In the present example, exhaust gas that passes through bypass passage 78 or turbine 74 flows to exhaust aftertreatment system 42. Exhaust aftertreatment system 42 is disposed in exhaust passage 76 and may include a three-way catalyst (TWC), diesel oxidation catalyst, diesel particulate filter (DPF), selective catalytic reduction (SCR) catalyst, or combinations thereof. In the present example, aftertreatment system 42 is shown coupled to the coolant system circuit 44 at 82 and 84. In further examples, heating element 72 is coupled to, or included in, aftertreatment system 42. Further examples of engine 10 may include one or both of a low pressure (LP) and a high pressure (HP) exhaust gas recirculation (EGR) loop, along with corresponding valves and sensors.

FIGS. 2-9 show scale drawings of an embodiment of an exhaust manifold 200. Manifold 200 is a sand cast manifold forming a plurality of inlets 202, 204 and 206 to runners 208, 210, and 212 an outlet passage 214, and coolant jacket 216, and is one example of manifold 36 described above. In the present example there are three runners coupled to three cylinders of an example engine, but in further examples there may be less than or greater than three runners depending on the number of cylinders in the example engine. Also in the present example, manifold 200 includes a silicon molybdenum alloy (e.g., HiSiMo); further examples may include additional and alternative materials.

Figure 2:
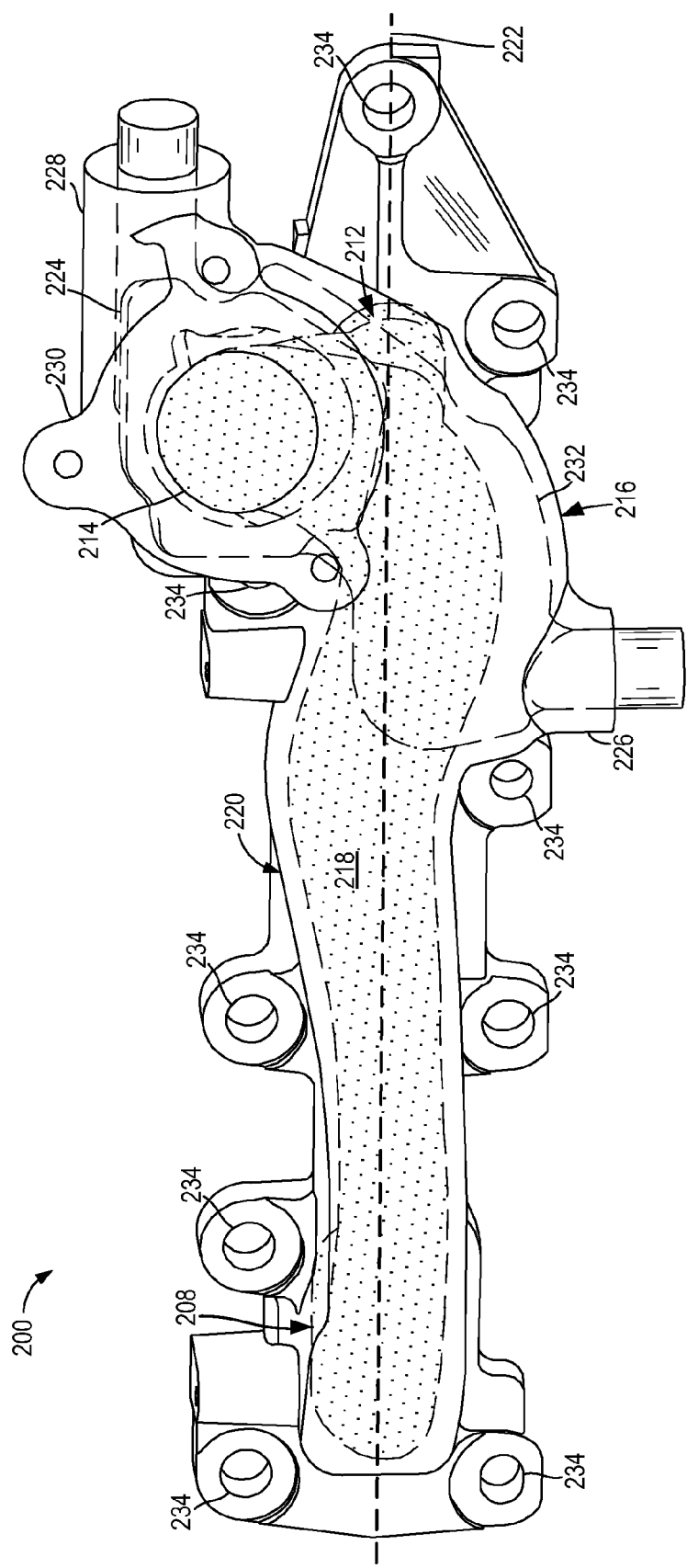
FIG. 2 shows a first semi-transparent view of an example exhaust manifold including a collar coolant jacket.

FIG. 2 shows a first view of manifold 200. Manifold 200 is shown semi-transparent with dotted shading indicating an interior passage 218 defined by an interior of manifold housing 220. During casting, the interior passage 218 is filled by a main manifold core (discussed in more detail below with respect to FIGS. 8 and 9). Interior passage 218 extends from a first inlet 202 to a last inlet 206 along longitudinal axis 222 (discussed in more detail below with respect to FIGS. 3-5 and 9). Manifold 200 is longer along the longitudinal axis 222 than in a second direction extending away from the example engine. Further manifold 200 is longer along longitudinal axis 222 than in a third direction perpendicular to the longitudinal direction and the second direction.

Manifold 200 includes example coolant jacket 216 also defined by the manifold housing 220. The coolant jacket 216 includes an example collar 224, fluidically coupling a coolant inlet 226 and outlet 228. Coolant outlet 228 extends parallel the longitudinal axis 222. The collar 224 is adjacent outlet passage 214, the outlet passage 214 shown as a section of the interior passage 218 leading to an example turbocharger (discussed in more detail above with respect to FIG. 1). The collar 220 is also adjacent example manifold flange 230 (which includes a plurality of flange bolt eyelets, described in more detail below with respect to FIG. 3). In the present example, collar 224 includes a longitudinal section 232 of the jacket 216 extending parallel the longitudinal axis 222. The longitudinal section 232 is directly coupled, via casting, to the collar 224 and the coolant inlet 226.

Additionally, the position of the collar 224 is decoupled from the runners 208, 210 (shown in FIG. 4) and 212. Because the coolant jacket 216 is not adjacent to any of the runners, exhaust gases flowing from the inlets through the exhaust manifold 200 retain more thermal energy than exhaust in a manifold including an encompassing coolant jacket. In this way, the amount of thermal energy sent to the example turbocharger coupled to the exhaust manifold 200 is increased. Further, because manifold 200 includes coolant jacket 216, thermal stress to the adjacent manifold flange 230 and outlet passage 214 is reduced. Consequently, exhaust manifold housing 220 may be made of a material other than ferritic or austenitic steel.

Additionally, in the present example, the exhaust manifold housing 220 includes a plurality of engine bolt eyelets 234 (which may or may not be threaded) for coupling the manifold 200 to the example engine via an example cylinder head gasket (as described in more detail above, with respect to FIG. 1).

Figure 3:
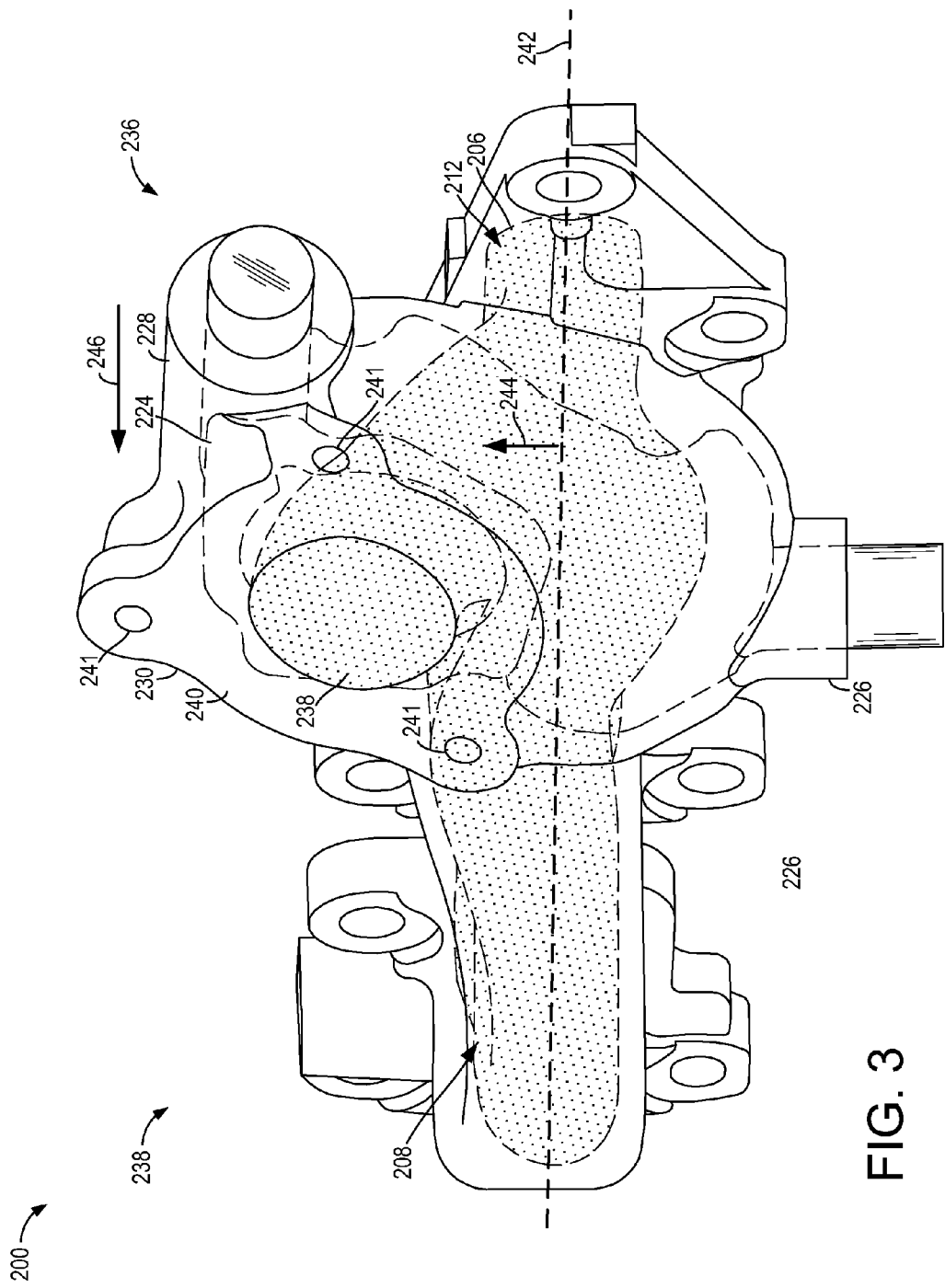
FIG. 3 shows a second semi-transparent view of the example exhaust manifold of FIG. 2.

Turning next to FIG. 3, a second semi-transparent view of exhaust manifold 200, and more particularly a first end 236, is shown. In the present example, outlet passage 214 terminates at manifold flange 230. Manifold flange 230 includes a plurality of flange bolt eyelets 241. Furthermore, in the present example, longitudinal section 232 is not penetrated or interrupted by any of the flange bolt eyelets 241.

In the present example, both the collar 224 and a manifold flange face 240 are in a first plane and the coolant inlet 226 and coolant outlet 228 extending out in a second plane not parallel to the first plane. In further examples, the coolant inlet 226, coolant outlet 228, collar 224 and flange face 240 all lie in planes parallel to each other. In additional examples, a plane parallel to the directions in which coolant inlet 226 and coolant outlet 228 extend is skew to a plane including at least one of the collar 224 and a manifold flange face 240.

A third plane 242 is perpendicular to the view of FIG. 3. In the present example, longitudinal axis, shown at 222 in FIGS. 1-2, 4-5, 7 and 9, lies in plane 242. Further, plane 242 is defined as a plane that intersects the totality of the runners, (of which, runner 208 and runner 212 are shown in FIG. 3).

Outlet passage 214 is shown distal from the runners and is asymmetrically positioned at the first end 236. The first end 236 is extended down the longitudinal axis, opposite from the second end 238 of the manifold. Further, the outlet passage 214 extends out away from the plane 242, in an upward direction indicated at arrow 244. The upward direction indicated at 244 is opposite the direction coolant inlet 226 extends. Additionally, outlet passage 214 extends in a direction, indicated at arrow 246, away from the inlets (for example, inlet 206) and parallel with the runners (for example, runner 212). Further, collar 224 and coolant outlet 228 are positioned above the plane 242.

Figure 4:
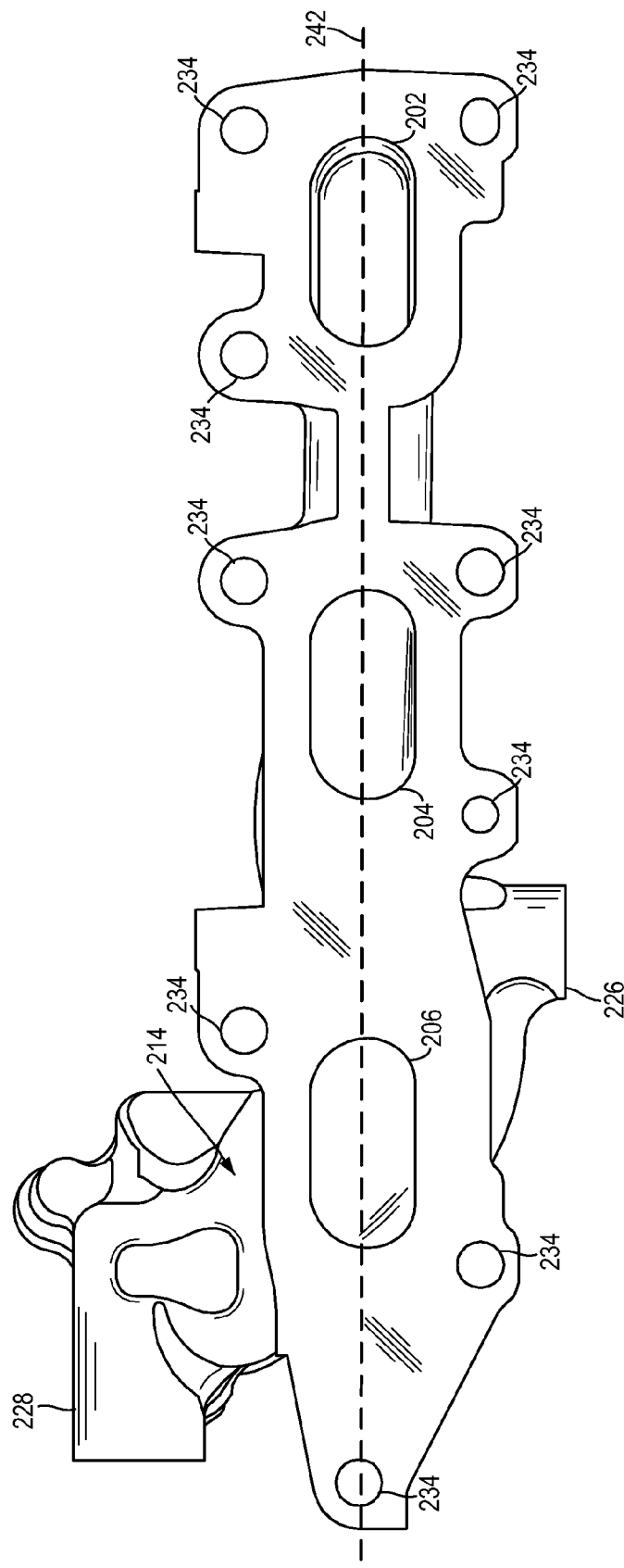
FIG. 4 shows an opaque view of the example exhaust manifold of FIG. 2.

Turning next to FIG. 4, manifold 200 is shown in an opaque view looking towards inlets 202, 204 and 206 away from where an example engine would couple to manifold 200. Plane 242 cuts across the current view and, as discussed above, the plurality of inlets 202, 204 and 206 to runners 208, 210 and 212, included in plane 242, extend out away the viewer into the page. The plurality of engine bolt eyelets 234 are arranged around the plurality of inlets 202, 204 and 206 to distribute a bolt load when the runners 208, 210 and 212 are coupled to an example cylinder head gasket. Further, FIG. 4 shows the coolant inlet 226 extending in a direction perpendicular to the plane 242. As discussed above (with respect to FIG. 3) coolant outlet 228 is positioned vertically above plane 242. Similarly outlet passage 214 extends above plane 242.

Figure 5:
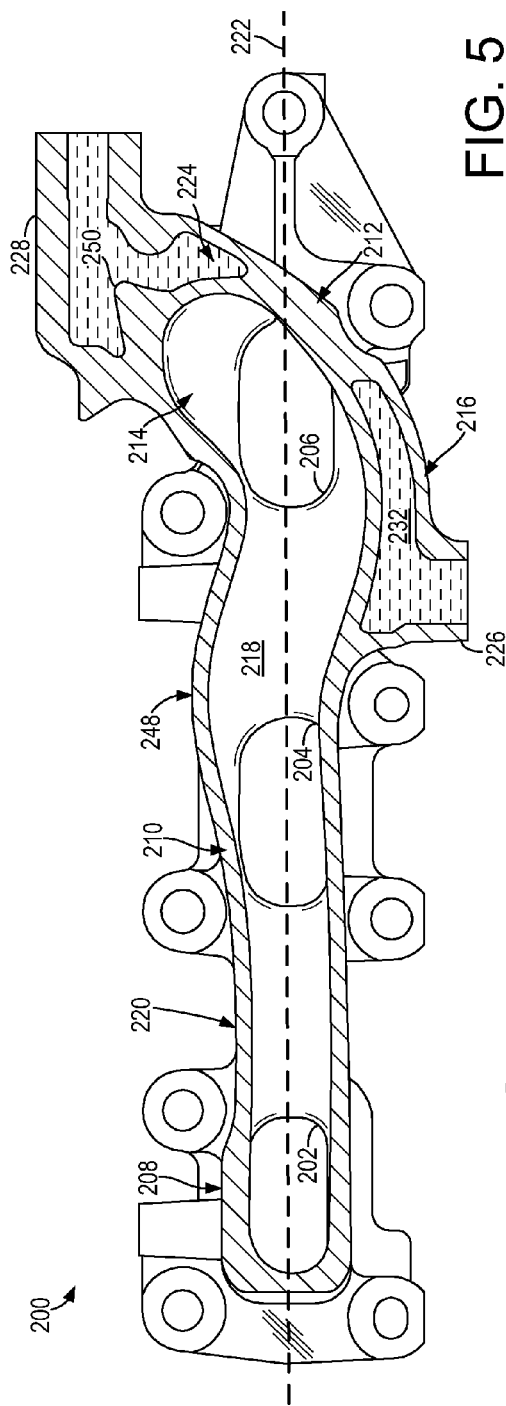
FIG. 5 shows a first cut-away view of the example exhaust manifold of FIG. 2.
Figure 6:
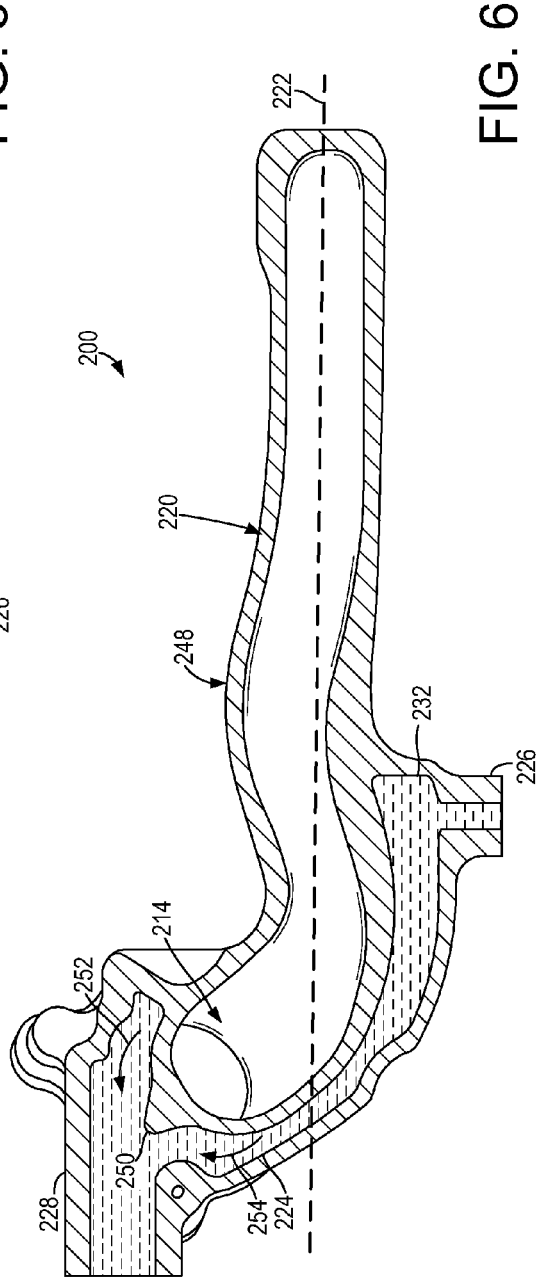
FIG. 6 shows a second cut-away view of the example exhaust manifold of FIG. 2.

FIG. 5 is a first cut away view of exhaust manifold 200, looking towards where an example engine would be positioned. Inlets 202, 204 and 206 are shown leading to interior passage 218. In the present example, manifold housing 220 defines the interior passage 218 which includes a bend 248. In the present example, bend 248 does not extend in the direction of the longitudinal axis beyond inlet 204. The bend 248 continues in the opposite direction toward inlet 206. Turning quickly to FIG. 6, exhaust manifold 200 is shown in a second cut away view, looking away from a position of an example engine. FIG. 6 also shows bend 248 formed in interior passage 218, defined by housing 220. Bend 248 extends further along longitudinal axis 222 than coolant inlet 226 or longitudinal section 232 in a direction away from outlet passage 214. Further, bend 248 is included in the present example to improve and enable the combination of flow from the first inlet 202, second inlet 204 and third inlet 206. Additionally bend 248 is included in the present example to improve and enable the direction of flow toward outlet passage 214 (as described elsewhere, for example with respect to FIGS. 2-4).

Returning to FIG. 5, coolant outlet 228 is shown extending out parallel to the longitudinal axis 222 of the manifold. Further, coolant inlet 226 extends downward substantially perpendicular to both the runners and the coolant outlet 228. Further, collar 224 includes diverter rib 250. Diverter rib 250 is defined by the shape of housing 220 on an interior of the coolant jacket 216 and on a circumference of the outlet passage 214.

Returning to FIG. 6, the diverter rib 250 included in collar 224 is shown in relation to the coolant outlet 228 and the outlet passage 214. Further, diverter rib 250 extends into an interior of the coolant jacket collar 224. In the present example, the inclusion of diverter rib into manifold 200 creates more surface area over which coolant inside coolant jacket 216 may flow, thus increasing heat transfer efficiency between the outlet passage 214 and the coolant jacket 216. Further, the diverter rib 250 extends toward the coolant outlet 228, and is positioned where an example first flow path 254 and an example second flow path 256 meet. The positioning of the diverter rib 250 in the present example may direct flow of coolant from each of the flow paths 252 and 254, so that when the first and second flow paths 252 and 254 combine, an amount of turbulence in coolant flow is decreased.

Turning now to FIG. 7, a further cut away view of exhaust manifold 200 at the first end 236 is shown. Longitudinal section 232 includes a longitudinal flow path 256 in the present example. The longitudinal flow path 256 directs coolant flow from the coolant inlet 226 to collar 224. Collar 224 splits the longitudinal flow path 256 into only first flow path 254 and second flow path 256 defined. The two flow paths 254 and 256 collectively surrounding the circumference of the outlet passage 214. Further, coolant within the collar 224 thermally communicates with the outlet passage 214 via the housing 220 (e.g., a cast metal wall).

The first flow path 254 includes a first collar profile and the second flow path 256 includes a second collar profile. In the present example, each collar profile is the shape of the interior of the collar, which is important in defining coolant flow direction, velocity and pressure, in each flow path respectively. Further, in the present example collar 224 has a smooth surfaced interior. Additionally, each flow path may define a cross-sectional area through which coolant may flow. In some examples the cross-sectional area may be perpendicular to a direction of flow. What is more, the coolant inlet 226 has an inlet profile and in the present example, the cross-sectional areas of both the first and second collar profiles are less than a cross-sectional area of the coolant inlet profile. In further examples, only one of the first and second collar profiles has a cross-sectional area less than the cross-sectional area of the coolant inlet profile.

Next, FIG. 8 shows a first view of the exhaust and coolant passages of exhaust manifold 200. Interior passage 218, outlet passage 214 and coolant jacket 216 are shown without an example manifold housing (described above with respect to FIGS. 2-7). In one example, interior passage 218 and outlet passage 214 define a main exhaust core, and coolant jacket 216 defines a coolant core. Both the main exhaust core and coolant core are casting cores in such an example. These casting cores are positioned as shown and would be placed together into an exterior mold during a casting process. Metal poured into the mold may then take the shape of the molds, hardening and forming the housing of example manifold 200. Such a casting process is well known in the art.

FIG. 9 shows a second view of the exhaust passages and coolant passages of manifold 200 looking downward toward to a top of interior passage 218 and coolant jacket 216. Outlet passage 214 is shown distal from the runners and asymmetrically positioned at first end 236 of manifold 200. Outlet passage 214 is reflected across longitudinal axis 222 from runners, 208, 210 and 212. In this way outlet passage 214 may be distal from the runners. In the present example runner 210 is approximately a longitudinal middle of the manifold 200, and the first manifold end 236 is a region of the manifold extending from runner 210 toward runner 212 along the longitudinal axis 222 and second manifold end 238 is a region extending along manifold 200 in an opposite direction. In this way the outlet passage 214 may be asymmetrically positioned.

Further, one example of how far longitudinal section 232 extends parallel to longitudinal axis 222 is shown in FIG. 9. In the present example, a length of longitudinal section 232 is less than a distance between successive exhaust runners (e.g., runners 210 and 212). Furthermore, in general, a length of the longitudinal section 232 may be equal to, or less than, half the longitudinal length of the interior passage 218.

Finally, turning to FIG. 10, an example method 1000 for heating engine systems is illustrated. In the present example, method 1000 may include the use of an example control system and/or exhaust manifold system including an example exhaust manifold with collar coolant jacket, example turbocharger, example exhaust aftertreatment system, and example coolant system circuit.

Example method 1000 starts to 1010 by combusting fuel in a cylinder of an engine. After fuel has been combusted in a cylinder of the engine, the exhaust gases may be vented from the cylinder to an example exhaust manifold with coolant jacket, the coolant jacket including a collar. As hot exhaust gases enter the manifold, the method may optionally include at 1012, flowing coolant through a coolant inlet fluidically coupled to the collar.

After 1012, the method may optionally continue to 1014 which includes splitting coolant flow into a first flow path and a second flow path in the collar, the first flow path including a first collar profile, the second flow path including a second collar profile and the coolant inlet having an inlet profile, a cross-sectional area of at least one of the first and second collar profiles less than a cross-sectional area of the inlet profile. Further, the collar may include only the first and second flow paths and the collar may include a smooth interior surface to encourage laminar flow. The interior of the collar defines the flow paths and the flow paths collectively surround a circumference of an example outlet passage.

Next, the method includes adsorbing heat from combusted fuel exhaust into a coolant via the coolant jacket, the coolant jacket including the collar, the collar only surrounding the circumference of an exhaust outlet passage adjacent a manifold flange, the outlet passage terminating with the manifold flange at 1016. Furthermore, the outlet passage may be asymmetrically positioned at a first manifold end, distal from a plurality of exhaust runners. Additionally, the outlet passage extends in two directions. First, the outlet passage extends out away from a plane including the totality of runners. Second, the outlet passage extends parallel from the runners, away from inlets included in the runners.

Next, method 1000 optionally includes recombining heated coolant of the first and second flow paths within the collar while flowing the heated coolant to the coolant outlet at 1018. It should be appreciates recombining heated coolant at 1018 may only be included in examples method 1000 that further include processes that split coolant flow into two or more flow paths (e.g., as at 1014).

After either completing 1016 or 1018, the method continues to 1020 which includes flowing heated coolant from an outlet of the coolant jacket to a heating circuit, the heating circuit including a heating element for at least one of a cabin heater, a catalyst, an injector, an intake air heater, and a positive crankcase ventilation system. The method may then continue to 1022 to flow combusted fuel exhaust to a turbine of a turbocharger, an amount of retained heat of combusted fuel exhaust greater than an amount of coolant adsorbed heat. After 1022, the method 1000 may end.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. An exhaust manifold system comprising:
 a plurality of runners extending perpendicular to a longitudinal manifold axis;
 an outlet passage distal from the runners and terminating with a manifold flange; and
 a coolant jacket not adjacent the runners including:
  a coolant inlet and outlet for coupling to a coolant system; and
 a collar coupling the coolant inlet and outlet, the collar adjacent and surrounding the outlet passage, adjacent the manifold flange, and decoupled from the runners, the collar including only a first flow path and a second flow path defined by an interior of the collar, the first and second flow paths collectively surrounding a circumference of the outlet passage, the collar including a smooth interior surface, the first flow path including a first collar profile, the second flow path including a second collar profile and the coolant inlet having an inlet profile, a cross-sectional area of the first and second collar profiles less than a cross-sectional area of the inlet profile, where the coolant jacket further includes a diverter rib extending into an interior of the coolant jacket collar, the diverter rib extending toward the coolant outlet where the first and second flow paths meet.

2. The exhaust manifold system of claim 1, further comprising a turbocharger coupled to the manifold flange.

3. The exhaust manifold system of claim 1, where
the coolant outlet extends out parallel to the longitudinal manifold axis and the coolant inlet extends downward substantially perpendicular to both the runners and the coolant outlet, and
the collar surrounds the circumference of the outlet passage and coolant within the collar thermally communicates with the outlet passage via a cast metal wall defining partially the outlet passage and the collar, at least one of the collar and a manifold flange face in a first plane and the coolant inlet and coolant outlet extending out in a second plane not parallel to the first plane.

4. The exhaust manifold system of claim 3, where there are three runners, the collar only surrounding the outlet passage, the three runners sharing a third plane and the outlet passage extending out away from the third plane opposite the coolant inlet, the outlet passage also extending parallel to the runners and away from a plurality of inlets to the runners.

5. The exhaust manifold system of claim 1 wherein a cast manifold forms the plurality of runners and inlets to the runners, the outlet passage, and the coolant jacket, the cast manifold a silicon molybdenum alloy.

6. The exhaust manifold system of claim 1, further comprising a coolant system circuit coupled to the coolant outlet, the coolant system circuit including a heating element for at least one of a cabin heater, a catalyst, an injector, an intake air heater, and a positive crankcase ventilation system.

7. The exhaust manifold system of claim 6, further comprising a quick connect tube coupling at least one of the coolant outlet and coolant inlet to the coolant system, the quick connect tube including an annular elastomeric seal and a snap ring at an end of the tube, the snap ring for securing the tube in place via a straight line axial movement of the tube over the at least one of the coolant outlet and coolant inlet, the secured tube forming a dynamic seal.

8. A cooled exhaust manifold system comprising:
a plurality of inlets to runners extending perpendicular to a longitudinal manifold axis, the plurality of inlets to runners sharing a plane;
an outlet passage distal from the runners and asymmetrically positioned at a first end of the cooled exhaust manifold system, the outlet passage extending out away from the plane of runners and the outlet passage extending parallel to the runners away from the inlets, and the outlet passage terminating with a manifold flange; and
a coolant jacket not adjacent the plurality of inlets to runners including:
a coolant inlet and a coolant outlet both for coupling to a coolant system; and
a collar fluidically coupling the coolant inlet and outlet, the collar adjacent the outlet passage and the manifold flange and decoupled from the runners, a longitudinal section of the jacket extending parallel to the longitudinal axis, the longitudinal section directly coupled, via casting, to the collar and the coolant inlet, a length of the longitudinal section equal to, or less than, half the longitudinal length of the cooled exhaust manifold system.

9. The cooled exhaust manifold system of claim 8, where
the longitudinal section defines a longitudinal flow path from the plurality of inlets to runners to the collar,
the collar splits the longitudinal flow path into only a first flow path and a second flow path, the first and second flow paths defined by an interior of the collar, the two flow paths collectively surrounding a circumference of the outlet passage, the collar including a smooth interior surface, the first flow path including a first collar profile, the second flow path including a second collar profile and the coolant inlet having an inlet profile, a cross-sectional area of the first or second collar profiles less than a cross-sectional area of the inlet profile, and
the coolant jacket further includes a diverter rib on the circumference of the outlet passage and inside the coolant jacket collar, the diverter rib extending toward the coolant outlet where the first and second flow paths meet.

10. The cooled exhaust manifold system of claim 8, where the manifold flange is coupled to a turbocharger.

11. The cooled exhaust manifold system of claim 8, wherein a cast manifold forms the plurality of inlets and runners, the outlet passage, and the coolant jacket, the cast manifold a silicon molybdenum alloy.

12. The cooled exhaust manifold system of claim 8, where
the coolant outlet extends out parallel to the longitudinal manifold axis and the coolant inlet extends downward substantially perpendicular to both the runners and the coolant outlet, and
the collar surrounds the circumference of the outlet passage and coolant within the collar thermally communicates with the outlet passage via a cast metal wall defining partially the outlet passage and the collar, the collar in a first cross section plane of the outlet passage and a face of the manifold flange in a second plane not parallel to the first plane.

13. The cooled exhaust manifold system of claim 8, where the coolant outlet is coupled to a coolant system circuit, the coolant system circuit including a heating element for at least one of a cabin heater, a catalyst, an injector, an intake air heater, and a positive crankcase ventilation system.

14. The cooled exhaust manifold system of claim 13, further comprising a quick connect tube coupling at least one of the coolant outlet and the coolant inlet to the coolant system, the quick connect tube including an annular elastomeric seal and a snap ring at an end of the tube, the snap ring for securing the tube in place via a straight line axial movement of the tube over the at least one of the coolant outlet and the coolant inlet, the secured tube forming a dynamic seal.

15. The cooled exhaust manifold system of claim 8, where a length of longitudinal section is less than a distance between successive exhaust runners of the plurality of inlets to runners.

16. The cooled exhaust manifold system of claim 8, where the manifold flange includes a plurality of flange bolt eyelets, and the longitudinal section not penetrated by any of the flange bolt eyelets.

* * * * *